Figure 1:
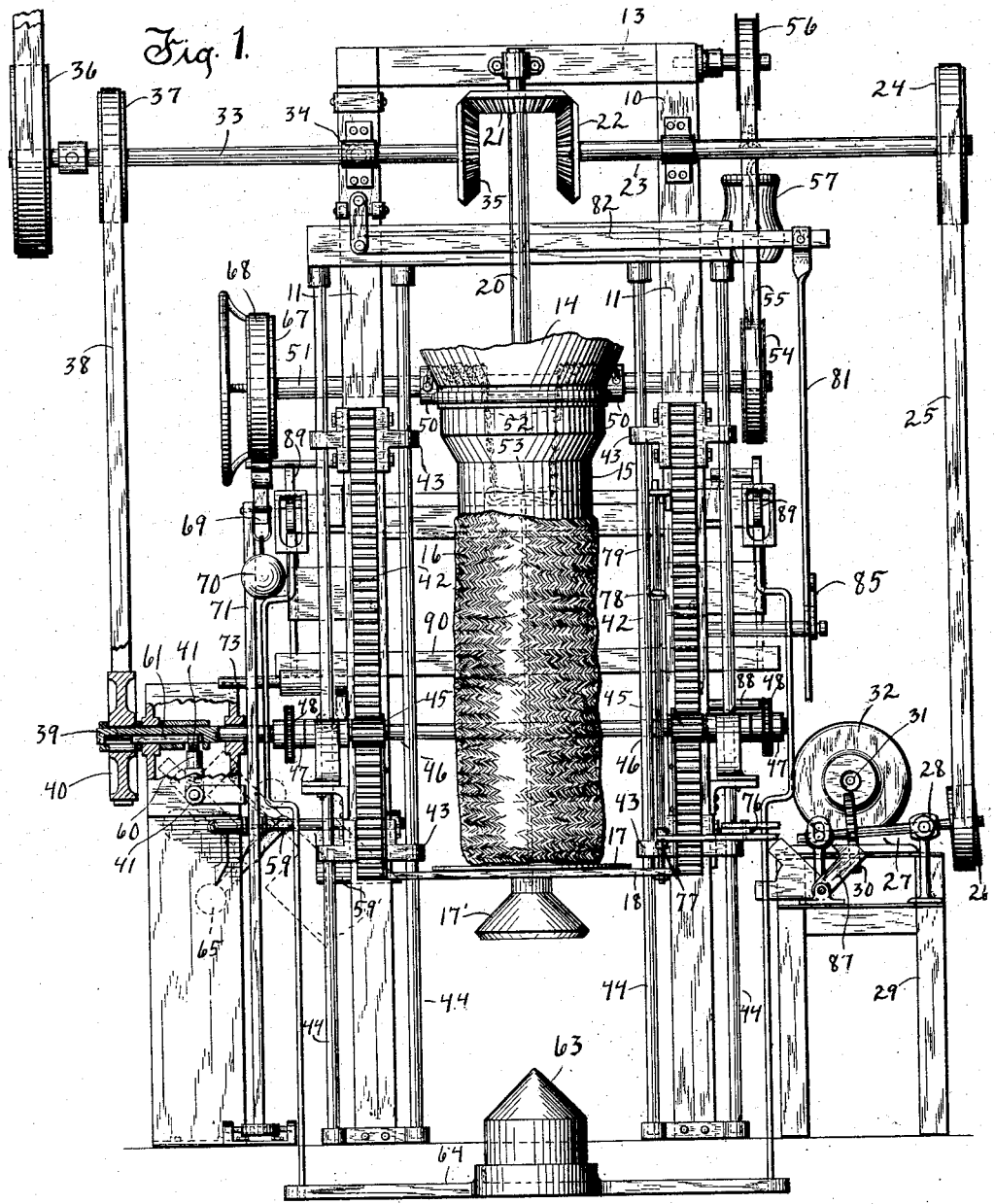

W. S. SMITH & H. W. WELSH.
MATERIAL PACKING AND WEIGHING MACHINE.
APPLICATION FILED MAR. 24, 1913.

1,134,705.

Patented Apr. 6, 1915.
6 SHEETS—SHEET 1.

W. S. SMITH & H. W. WELSH.
MATERIAL PACKING AND WEIGHING MACHINE.
APPLICATION FILED MAR. 24, 1913.

1,134,705.

Patented Apr. 6, 1915.
6 SHEETS—SHEET 5.

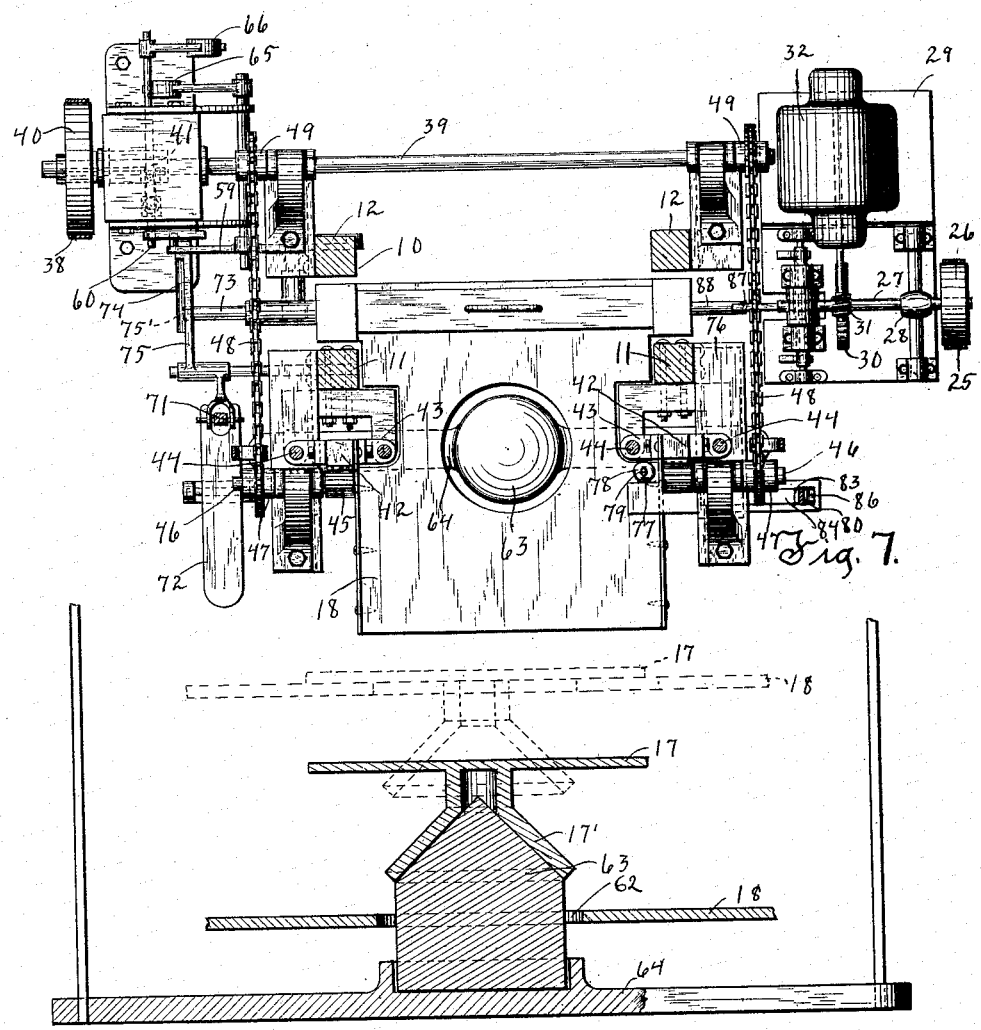

UNITED STATES PATENT OFFICE.

WALTER S. SMITH, OF CHICAGO, ILLINOIS, AND HENRY W. WELSH, OF NORTH MILWAUKEE, WISCONSIN, ASSIGNORS, BY MESNE ASSIGNMENTS, TO W. & T. AVERY LTD., OF BIRMINGHAM, ENGLAND.

MATERIAL PACKING AND WEIGHING MACHINE.

1,134,705.      Specification of Letters Patent.      Patented Apr. 6, 1915.

Application filed March 24, 1913. Serial No. 756,358.

*To all whom it may concern:*

Be it known that we, WALTER S. SMITH, a citizen of the United States, and a resident of Chicago, in the county of Cook and State of Illinois, and HENRY W. WELSH, a subject of the King of England, and resident of North Milwaukee, in the county of Milwaukee and State of Wisconsin, have invented new and useful Improvements in Material Packing and Weighing Machines, of which the following is a description, reference being had to the accompanying drawings, which are a part of this specification.

This invention relates to improvements in material packing and weighing machines and more particularly to machines for packing and weighing flour and other like non-freely flowing material in sacks or bags.

In the present use of automatic machines for packing and weighing non-freely flowing material, such as flour, it has been found very difficult to feed and pack the material into sacks and to automatically weigh the same with any degree of accuracy due to the fact that the material has a tendency to drop into the bags in lumps and the weighment is either under or overweight.

It has also been found to be difficult in the present practice to pack the material into the bag without disturbing the accuracy of the weighment as the pressure of the packing means tends to react on the weighing mechanism and cause an underweight of material.

It is one of the objects of the present invention to provide a material packing and weighing machine which is adapted to overcome the before mentioned objectionable features and provide a machine which will automatically pack and weigh the material accurately.

A further object of the invention is to provide a material packing and weighing machine which will pack the major portion of the material into a bag or sack and then automatically place the bag upon a scale and complete the weighment at a slower rate of speed.

A further object of the invention is to provide a material packing and weighing machine with a main or maximum feed and with an auxiliary or minimum feed in order to obtain great rapidity and accuracy in the feed and weighing of the material.

A further object of the invention is to provide a material packing and weighing machine parts of which are actuated from a source of power.

A further object of the invention is to provide a material packing and weighing machine which is comparatively simple in construction and is entirely automatic in its operations.

With the above and other objects in view, the invention consists of the improved material packing and weighing machine and its parts and combinations as set forth in the claims, and all equivalents thereof.

Figure 2:
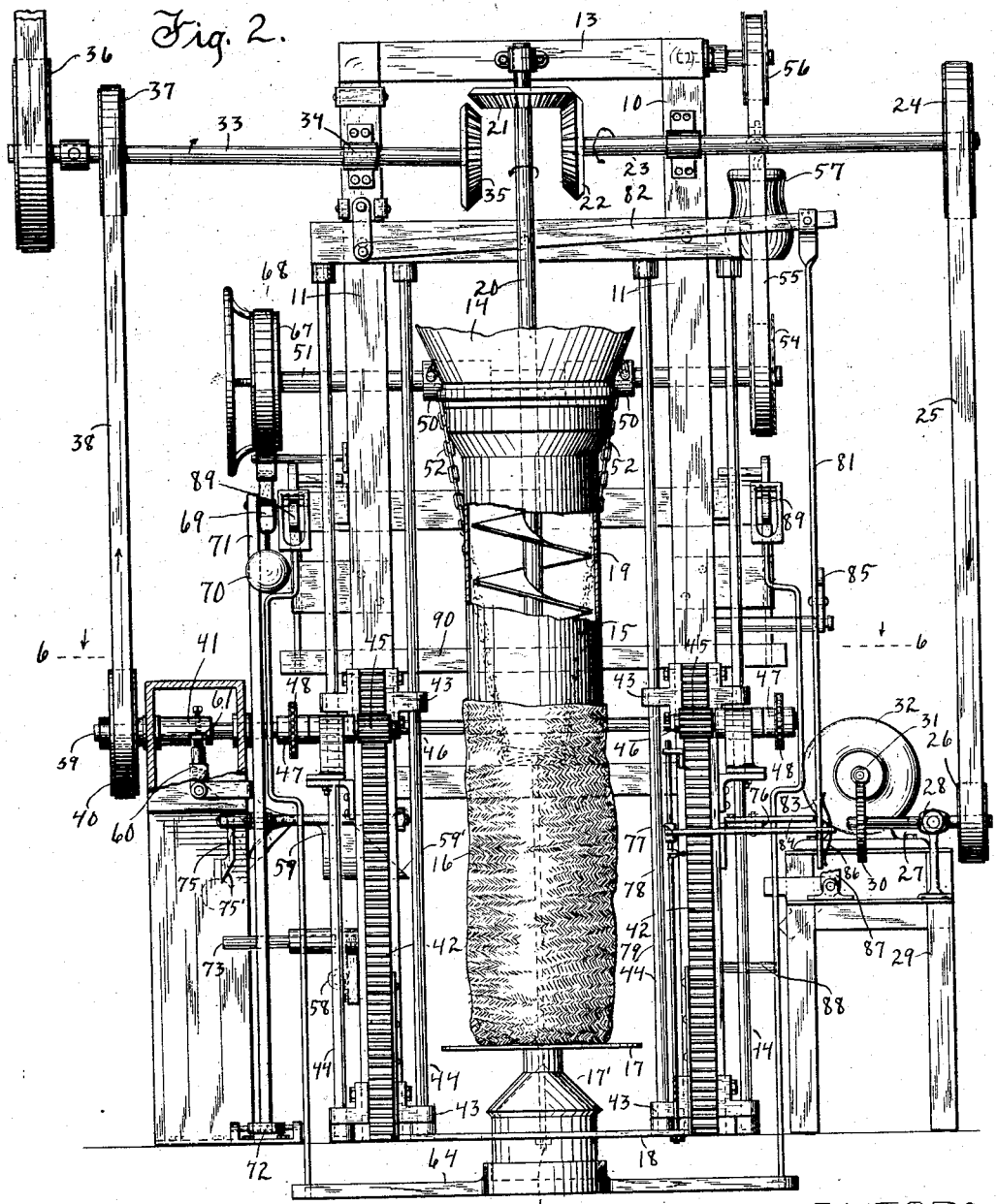
Figure 3:
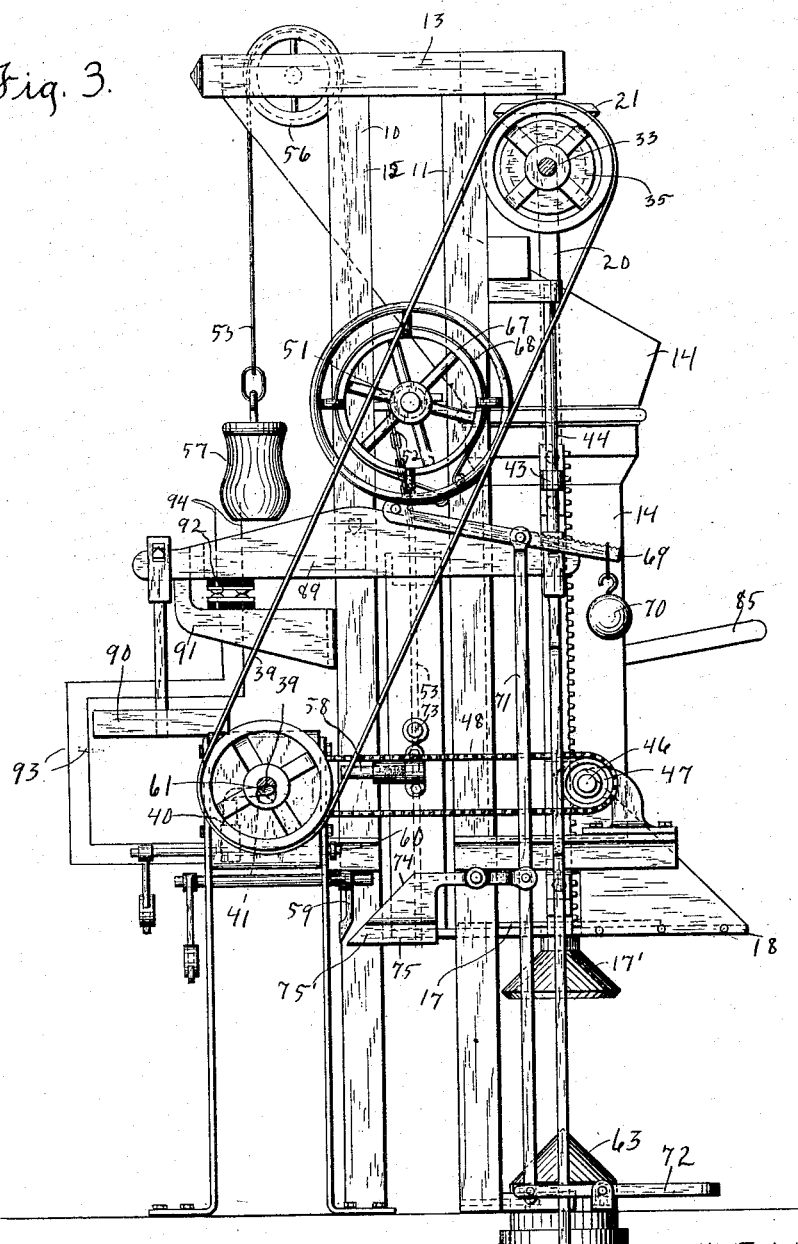
Figure 4:
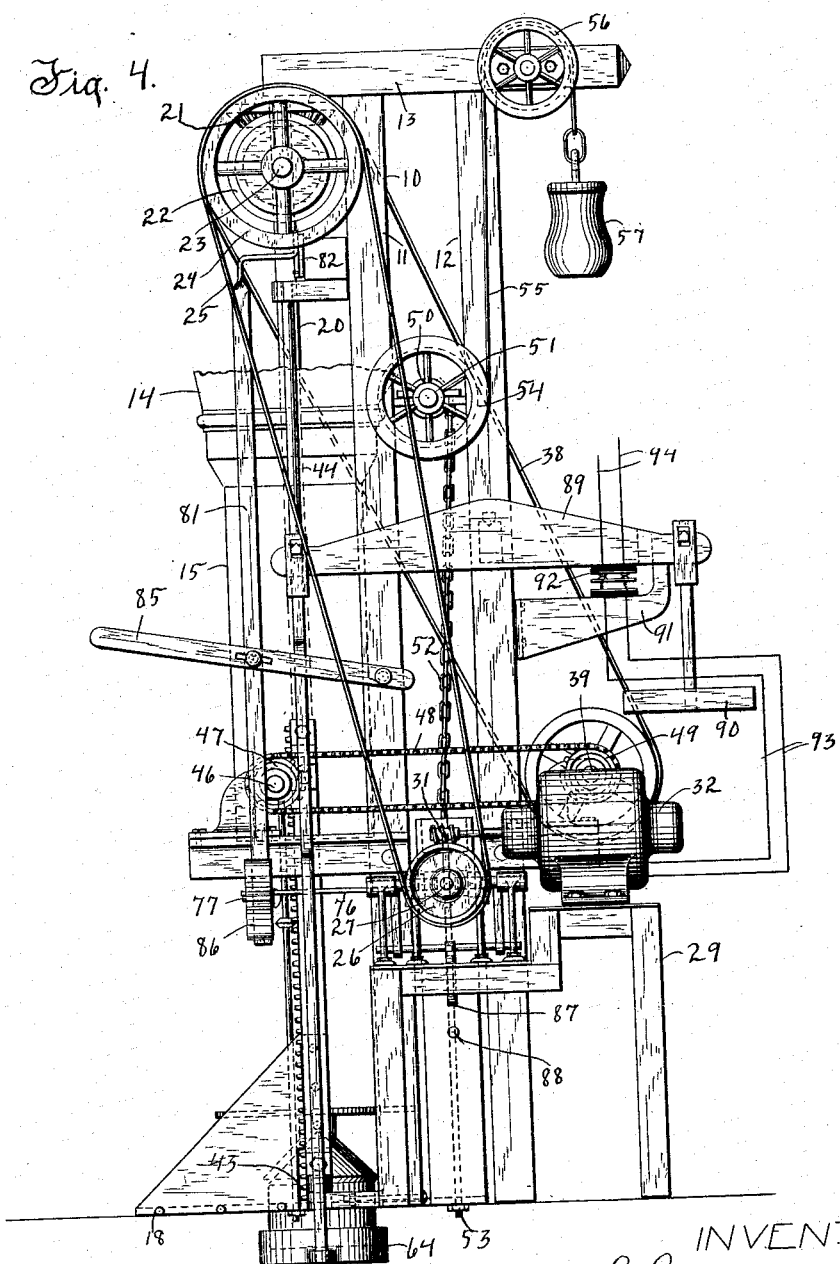
Figure 5:
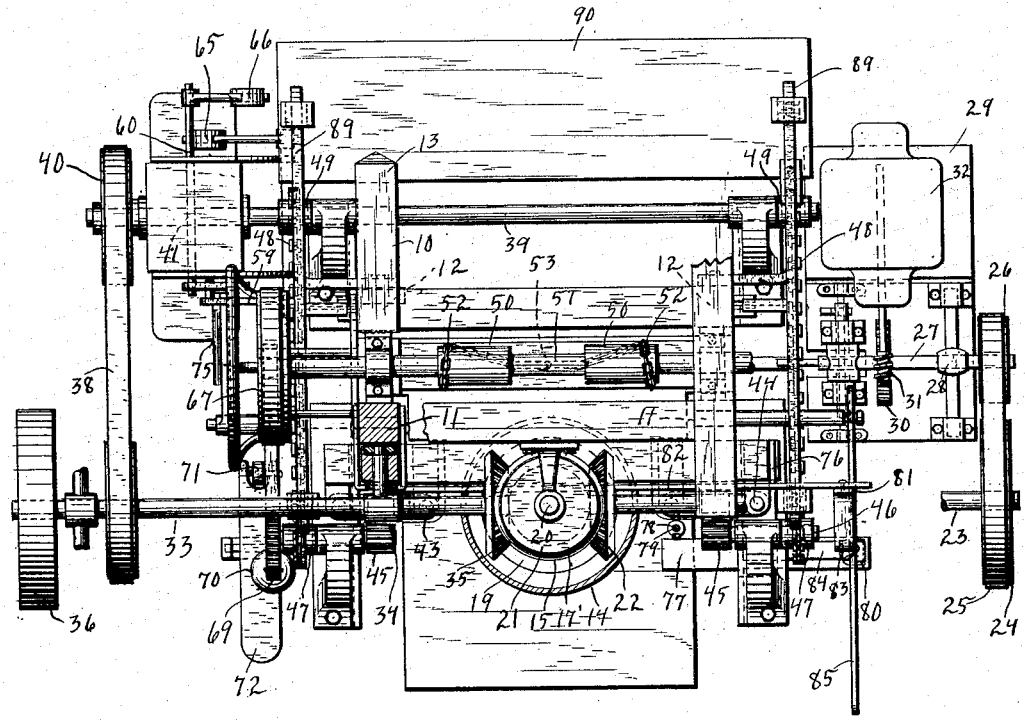

In the accompanying drawings in which the same reference characters indicate the same parts in all of the views: Figure 1 is a front view of the improved material packing and weighing machine showing the manner of filling a bag, the upper portion of the material hopper being broken off to illustrate parts in the rear thereof; Fig. 2 is a similar view thereof showing the bag as in its lowermost position and resting upon the scale beam; Fig. 3 is a side view thereof; Fig. 4 is a view of the opposite side of the material packing and weighing machine to that shown in Fig. 3; Fig. 5 is a top view thereof, portions being in section; Fig. 6 is a transverse sectional view of the machine taken on line 6—6 of Fig. 2; and Fig. 7 is a vertical sectional detail view of the lower portion of the machine.

Referring to the drawings the numeral 10 indicates the frame of the improved material packing and weighing machine which comprises forward and rearward upright side members 11 and 12 spaced apart and joined together at their upper ends by a rectangular top frame 13. The upper portion of the frame carries a hopper 14 positioned between the upright members and extending forwardly and downwardly therefrom which is provided with a discharge spout in the form of a tube 15 of approximately the inner diameter of the bag 16 to be filled to permit the bag to be easily slipped over the discharge end portion of the tube. The spout tube is of sufficient length to extend into the empty bag to a point adjacent to the bottom portion of the bag to discharge material into said bottom portion and as the bag is being filled to permit the bag to slip downwardly and off the tube. The bag while being filled with material is supported on the loose bottom portion 17 of the movable table 18.

A spiral conveyer 19 positioned within the spout tube 15 serves to positively discharge the material from the tube and also serves to pack the material into the bag. The conveyer is mounted on a vertical shaft 20, the upper end portion of which extends through the hopper and is journaled in a bearing carried by the upper frame. The upper end portion of this shaft carries a bevel gear 21 which is in mesh with another gear 22 mounted on the inner end of a horizontal shaft 23 journaled on the frame. The outer end of the shaft 23 is provided with a wheel 24 which has a belted connection 25 with a pulley 26 carried by the outer end of a short shaft 27. The short shaft 27 is journaled in a tiltable bearing 28 mounted on the motor frame 29 and the portion of the shaft on the opposite side of the tiltable bearing carries a worm wheel 30 which is adapted to be swung into mesh with a worm 31 mounted on the shaft of an electric motor 32 which is supported by said motor frame. The motor serves to run the spiral conveyer at a slow rate of speed during the final or dribble feed of material into the bag.

A main driving shaft 33 journaled in a slidable bearing 34 mounted on the upper end of one of the frame members 11 is provided with a bevel gear 35 which is arranged to be swung into engagement with the bevel gear 21 of the spiral conveyer by the slidable bearing 34 during the period of time the bag is receiving the major portion of its charge of material. The opposite end of the shaft 33 is provided with a pulley 36 for belted connection with a source of power and another pulley 37 mounted on the same end of the shaft has a belted connection 38 with an elevator shaft 39 extending transversely across the rear frame of the machine. The belt wheel 40 of the transverse shaft 39 is loosely mounted on said shaft and is connected thereto by a clutch mechanism 41 mounted on the frame and on the shaft and engaging the said belt wheel.

The movable table 18 has connected thereto two upstanding rack bars 42 positioned on opposite sides of the table which have fastened on the opposite sides thereof apertured guide brackets 43. Vertically extending guide rods 44 positioned in front of and connected to the frame extend through the openings of the guide brackets 43 and the guide brackets slide freely thereon and guide the table in its movements. The rack bars are in mesh with pinions 45 which are mounted on short shafts 46 journaled on the frame on opposite sides of the table and the opposite ends of these short shafts are provided with sprocket wheels 47 which have a sprocket chain connection 48 with sprocket wheels 49 carried by the transverse shaft 39.

The rack and pinion connection with the table serves to move the table downwardly to its lowermost position when the sack or bag has received its charge of material. The table is raised to its uppermost position by means of a pair of drums 50 mounted on a drum shaft 51 extending transversely of the rear portion of the frame and journaled thereon. The drums have chains 52 wound thereon and the lower ends of these chains are connected to the upper end of a rod 53, the lower end of which is attached to the table. One of the outer ends of this drum shaft has mounted thereon a belt drum 54 having a belt 55 wound thereon which extends upwardly and over an idle pulley 56 and has a weight 57 connected to its free end which serves to rotate the chain drums and lift the table 18. The idle pulley 56 is mounted on the upper frame.

As the material is packed into the bag or sack the bag and the table will be forced downwardly and when the bag has received the major portion of its charge the table will have arrived at a point where a yielding pin 58 carried by the table will engage a lever 59 and actuate said lever to swing a clutch lever 60 out of engagement with the spring pressed clutch locking dog 61 and thus permit said dog to lock the wheel 40 to the shaft 41 and rotate said shaft. This rotation will positively move the table downwardly to its lowermost position.

The table is provided with a medial opening 62 which is covered by loose bottom portion 17 and the said bottom portion is provided with a depending conical casing 17' which projects through the table opening and engages the conical portion 63 of the scale platform 64.

The table in its lowermost position will permit the loose bottom portion to rest directly upon the scale platform and free from contact with the table thus automatically transferring the bag to the scale and permitting the final amount of material to be fed to the bag while the bag is supported by the scale platform.

When the table 18 has reached its lowermost position the yielding pin 58 will slide off the inclined portion 59' of the lever 59 and permit the weights 65 and 66 of the levers 59 and 60 to restore the parts to their normal position and unclutch the pulley 40 from the shaft 41 and stop the rotation of said shaft. The opposite end of the shaft 51 is provided with a brake wheel 67 which is engaged by a brake band 68. The brake is of ordinary construction and is controlled by a lever 69 having a weight 70 adjustably connected to the lever to increase or diminish the braking effect. A rod 71 pivoted to the lever 69 and depending downwardly therefrom is connected at its lower end to a foot lever 72 for convenience of operation. In order to release the brake while the table is being moved downwardly by the pinions and racks a yielding trip pin 73 is provided which projects outwardly from the table. The pin is positioned during its downward movement to engage the inclined edge 74 of a lever 75 which is pivoted to the main frame and also to the rod 71 so that as the table is moved downwardly by the pinions the brake wheel will be automatically relieved of the braking effect of the brake band during the downward movement of the table and also while the table is in its lower most position. In moving upwardly the yielding pin is forced inwardly by the inclined portion 75' of said lever.

The main frame is provided with a projecting arm 76 which has pivoted to the lower surface thereof a trip lever 77 positioned to engage a cam 78 adjustably carried on a rod 79 which is connected to the table 18. The outer end portion of the trip lever 77 is provided with an opening 80 through which extends the lower end portion of a holding rod 81 which depends from and is connected to a gear changing lever 82. The lower end portion of the holding lug 83 which is engaged by a holding finger 84 projecting from the arm 76 when the holding rod is pulled downwardly. A hand lever 85 pivoted to the frame and to the holding rod 81 is conveniently positioned to be pulled downwardly by the operator. A flat spring 86 carried by the trip lever 77 bears against the outer side of the holding rod and serves to yieldingly press the holding rod against the end of the finger 84 and to permit the projecting lug to snap beneath said finger when the hand lever is pulled downwardly, the inner face portion of the lug being beveled for that purpose.

The downward movement of the holding rod 81 will swing the slidable bearing 34 upwardly and move the bevel gear 35 into mesh with the gear 21 and start the rotation of the spiral conveyer 19. The holding rod 81 will be held in its lower position during the initial feed of material into the sack by the holding finger and projection engagement and when this initial feed is almost completed the cam 78 will engage and swing the trip lever 77 to disengage the projection 83 from the finger and permit the bevel gear 35 to drop out of mesh with the gear 21 and stop the initial feed.

In order to start the final or slow feed of material into the sack to complete the weighment a bell crank lever 87 pivoted to the motor frame 29 and positioned beneath the short shaft 27 is arranged to swing the said shaft upwardly and the worm wheel 30 mounted thereon into mesh with the worm 31 of the motor 32. This engagement will cause the rotation of the spiral conveyer at a slower rate of speed through the connections before described. The bell crank lever 87 is swung to engage and disengage the tiltable shaft 27 by a pin 88 projecting from the side portion of the table 18.

The scale is of the even balance type and comprises the weighing beams 89 fulcrumed to the side of the frame and having the weighing platform 64 pivoted to the beams at one end and a weight platform 90 pivoted to the opposite ends of said beams. The platform is adapted to receive weights (not shown) of various amounts to balance the amount of material being weighed. Stops 91 projecting from the frame and extending beneath the rear ends of the beams limit the downward movement of said arms when the weighing platform is relieved of the weight of the bag of material.

An electric contact switch 92 carried by one of the stops and the rear end of one of the beams electrically connects the motor 32 to a source of current supply by means of the wires 93 and 94. The contact switch is so positioned with relation to the stop and the beam as to break the circuit and stop the motor and the flow of material as soon as the material on the weighing platform balances the weight on the weight platform.

In use the sack or bag is slipped over the spout end with the bottom portion of the bag resting on the movable portion of the table and the machine is started by pulling down on the hand lever to swing the main feed bevel gears into mesh. The material will now be discharged and packed into the sack and as the sack is filled it will be forced downwardly by the pressure of the spiral conveyer acting upon the material in the sack. When the major portion of the material has been packed into the sack the clutch mechanism will be actuated to rack the table downward and deposit the movable bottom portion of the table on the weighing platform. When the table reaches its lowermost position the clutch mechanism will be again automatically actuated to stop the rotation of the rack movement. In moving downwardly the table will actuate the brake to release the same while being racked downwardly and when the table reaches its lower position the brake will again be automatically set to hold the table in this position. Simultaneously with this movement the main feed bevel gears will be swung out of mesh by the trip lever and the motor slow feed mechanism will be actuated to turn the spiral conveyer at a slow speed. This slow feed will complete the weighment and when the material in the sack balances the weight on the weight platform the movement of the scale beam will break the motor circuit and the feed will stop. The filled and weighed sack is now removed and another bag is slipped over the discharge spout and the foot lever is depressed to release the brake. The table will now be pulled to its upper position by the lifting weight and in moving upwardly it will again raise the movable bottom portion from the weighing platform to its upper position and the operation of filling is again repeated.

From the foregoing description it will be seen that the material packing and weighing machine is well adapted for the purpose desired.

What we claim as our invention is:

1. A material packing and weighing machine, comprising a spout for discharging material into a sack, a movable table for supporting the sack while being partly filled, and a weighing platform positioned directly below the table to receive the partly filled sack and to support the same while it is receiving the balance of its charge of material.

2. A material packing and weighing machine, comprising a spout for discharging material into a sack, a movable table for yieldingly supporting the sack while being partly filled, means for packing the material while it is flowing into the sack, and a weighing platform positioned directly below the table to receive the partly filled sack and to support and automatically stop the flow of material into the sack when the sack has received the balance of its charge of material.

3. A material packing and weighing machine, comprising a spout for discharging material into a sack, a movable table for yieldingly supporting the sack while receiving the major portion of its charge, means for packing the material while it is flowing into the sack, a weighing platform positioned beneath the table for supporting the sack of material while it is receiving its minor charge of material, means for moving the partly filled sack of material to a position to be supported on the platform, and automatic means for stopping the flow of material into the sack when the material within the sack reaches a predetermined weight.

4. A material packing and weighing machine, comprising a spout for discharging material into a sack, means for feeding the material at different rates of speed, a movable table for yieldingly supporting the sack while receiving the major portion of its charge at a rapid speed rate, means for packing the material while it is flowing into the sack, a weighing platform positioned beneath the table for supporting the sack of material while it is receiving its minor charge of material at a reduced speed rate, means for moving the partly filled sack of material to a position to be supported on the platform, and automatic means for stopping the flow of material into the sack when the material within the sack reaches a predetermined weight.

5. A material packing and weighing machine, comprising a weighing mechanism, a spout for discharging material into a sack and having a variable feed, a table for holding the sack while it is receiving the major portion of its charge at a certain rate of feed, and means for moving the partly filled sack to a position to be supported on the weighing mechanism to receive the remaining portion of its charge at a slower rate of feed.

6. A material packing and weighing machine, comprising a weighing mechanism, a frame adjacent thereto, a table vertically slidably mounted thereon, a spout for discharging material into a sack supported on the table, said table adapted to support said sack while receiving a portion of its charge, means for packing said material within the sack, means for transferring the weight of the partly filled sack to the weighing mechanism to receive the remaining portion of its charge, and means controlled by the weighing mechanism for stopping the flow of material when the sack has received a predetermined weight of material.

7. A material packing and weighing machine, comprising a weighing mechanism, a frame adjacent thereto, a table vertically slidably mounted thereon, a discharge spout connected to the frame and provided with a revoluble material discharging means for discharging material from the spout into a sack and for packing the material in the sack, said table supporting said sack while being partly filled and packed, means for rotating the revoluble member at a certain speed, means for rotating the revoluble member at a slower rate of speed, means for moving the table downwardly to transfer the weight of the material to the weighing mechanism, the movement of said table downwardly changing the rotation of the revoluble member to the slow rate of speed, and means for stopping the rotation of the revoluble member when the sack has received a predetermined weight of material.

8. A material packing and weighing machine, comprising a weighing mechanism, a frame adjacent thereto, a table vertically slidably mounted thereon, a discharge spout connected to the frame and having a discharge tube adapted to extend into the sack being filled to a point adjacent to the lower end of the sack, a spiral conveyer mounted within the discharge tube for discharging material from the tube into the sack and for packing said material in the sack, said table supporting said sack while being partly filled and packed, means for yieldingly holding the table in an upper position, means for rotating the conveyer at a certain rate of speed, means for rotating the conveyer at a slower rate of speed, means for moving the table downwardly when the sack has received a predetermined portion of its charge to transfer the weight of the partly filled sack to the weighing mechanism, the movement of said table downwardly changing the rotation of the conveyer to the slow rate of speed, and means for stopping the rotation of the conveyer when the sack has received a predetermined weight of material.

9. A material packing and weighing machine, comprising a weighing mechanism, a frame adjacent thereto, a table vertically slidably mounted thereon, a weight for normally holding the table yieldingly in its upper position, a discharge spout connected to the frame and having a discharge tube adapted to extend into the sack to a point adjacent to the lower end of the sack, a spiral conveyer mounted within the discharge tube for discharging material from the tube into the sack and for packing said material in the sack, said table supporting said sack while being partly filled and packed, means for rotating the conveyer at a certain rate of speed, other means for rotating the conveyer at a slower rate of speed, means for positively moving the table to its lowermost position when the sack has received a predetermined portion of its charge to transfer the weight of the partly filled sack to the weighing mechanism, the movement of said table downwardly changing the rotation of the conveyer to the slow rate of speed, and means for stopping the rotation of the conveyer when the sack has received a predetermined weight of material.

10. A material packing and weighing machine, comprising a weighing mechanism having a weighing platform provided with an upstanding conical portion, a frame adjacent thereto, a table vertically slidably mounted thereon and provided with a medial opening covered by a loose bottom portion having a conical casing depending therefrom, a weight for normally holding the table yieldingly in its upper position, a discharge spout connected to the frame and having a discharge tube adapted to be extended into the sack to a point adjacent to the lower end thereof, a spiral conveyer mounted within the discharge tube for discharging material from the tube into the sack, said table supporting said sack while being partly filled and packed, a main driving means for rotating the conveyer at a certain rate of speed, an electric motor for rotating the conveyer at a slower rate of speed, a rack and pinion means for positively moving the table to its lowermost position when the sack has received a predetermined portion of its charge, the table in moving downwardly depositing the conical casing of the movable bottom portion upon the conical upstanding portion of the weighing mechanism, the downward movement of the table disconnecting the main driving means from the spiral conveyer and starting the electric drive of said conveyer, a brake means for holding the table in its lowermost position, and means for stopping the electric drive when the sack has received a predetermined weight of material.

In testimony whereof, we affix our signatures, in presence of two witnesses.

WALTER S. SMITH.
HENRY W. WELSH.

Witnesses:
CLARA V. MUELHBACH,
C. H. KEENEY.

Copies of this patent may be obtained for five cents each, by addressing the "Commissioner of Patents, Washington, D. C."